(12) United States Patent
Sato et al.

(10) Patent No.: US 12,017,309 B2
(45) Date of Patent: Jun. 25, 2024

(54) METHOD FOR SETTING EXCESS THICKNESS, DEVICE FOR SETTING EXCESS THICKNESS, METHOD FOR PRODUCING SHAPED OBJECT, AND PROGRAM

(71) Applicant: KOBE STEEL, LTD., Hyogo (JP)

(72) Inventors: Shinji Sato, Hyogo (JP); Takeshi Yamada, Hyogo (JP); Shuo Huang, Hyogo (JP); Masatoshi Hida, Hyogo (JP); Tatsuya Fujii, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 636 days.

(21) Appl. No.: 17/416,313

(22) PCT Filed: Nov. 27, 2019

(86) PCT No.: PCT/JP2019/046416
§ 371 (c)(1),
(2) Date: Jun. 18, 2021

(87) PCT Pub. No.: WO2020/129560
PCT Pub. Date: Jun. 25, 2020

(65) Prior Publication Data
US 2022/0072646 A1 Mar. 10, 2022

(30) Foreign Application Priority Data
Dec. 19, 2018 (JP) .................. 2018-237049

(51) Int. Cl.
*B23K 9/23* (2006.01)
*B23K 9/04* (2006.01)
(Continued)

(52) U.S. Cl.
CPC .................. *B23K 9/23* (2013.01); *B23K 9/04* (2013.01); *B23K 10/027* (2013.01);
(Continued)

(58) Field of Classification Search
CPC .......... B23K 9/23; B23K 9/04; B23K 10/027; B23K 15/0086; B23K 15/0093;
(Continued)

(56) References Cited

U.S. PATENT DOCUMENTS

2015/0352794 A1 12/2015 Nguyen et al.
2016/0151833 A1 6/2016 Tsao
(Continued)

FOREIGN PATENT DOCUMENTS

CN 102880756 A 1/2013
CN 108168483 A 6/2018
(Continued)

OTHER PUBLICATIONS

The extended European search report issued by the European Patent Office on Jul. 5, 2022, which corresponds to European U.S. Appl. No. 17/416,313-1103 and is related to U.S. Appl. No. 17/416,313.
(Continued)

*Primary Examiner* — Robert G Bachner
(74) *Attorney, Agent, or Firm* — Studebaker & Brackett PC

(57) ABSTRACT

An excess metal amount setting method includes: a thermal shrinkage prediction step of predicting a thermal shrinkage amount in the deposited body after manufacturing; a thermal shrinkage modifying step of obtaining a thermal deformation modifying profile by expanding a target profile according to the thermal shrinkage amount; a release strain prediction step of predicting an elastic deformation amount due to release strain of the deposited body after machining; an elastic deformation modifying step of obtaining an elastic deformation modifying profile by deforming the thermal deformation modifying profile according to the elastic deformation amount in a direction opposite to a deformation direction due to the release strain; and an excess metal
(Continued)

amount setting step of adjusting an outer edge shape of the deposited body so that an excess metal amount from the elastic deformation modifying profile to an outer edge of the deposited body falls within a predetermined reference range.

14 Claims, 13 Drawing Sheets

(51) Int. Cl.
| | | |
|---|---|---|
| *B23K 10/02* | (2006.01) | |
| *B23K 15/00* | (2006.01) | |
| *B23K 26/00* | (2014.01) | |
| *B23K 26/342* | (2014.01) | |
| *B23K 103/04* | (2006.01) | |
| *B33Y 10/00* | (2015.01) | |
| *B33Y 30/00* | (2015.01) | |
| *B33Y 50/02* | (2015.01) | |

(52) U.S. Cl.
CPC ...... *B23K 15/0086* (2013.01); *B23K 15/0093* (2013.01); *B23K 26/0006* (2013.01); *B23K 26/342* (2015.10); *B23K 2103/04* (2018.08); *B33Y 10/00* (2014.12); *B33Y 30/00* (2014.12); *B33Y 50/02* (2014.12)

(58) Field of Classification Search
CPC .............. B23K 26/0006; B23K 26/342; B23K 2103/04; B23K 2101/001; B23K 9/046; B33Y 10/00; B33Y 30/00; B33Y 50/02; B33Y 50/00; B22F 2003/247; B22F 7/08; B22F 10/66; B22F 5/06; B22F 2005/004; B22F 10/80; G06F 2113/10; G06F 2119/08; G06F 2119/18; G06F 30/23; Y02P 10/25; Y02P 90/02
See application file for complete search history.

(56) References Cited

U.S. PATENT DOCUMENTS

| | | |
|---|---|---|
| 2017/0203355 A1 | 7/2017 | Satoh et al. |
| 2018/0215100 A1 | 8/2018 | Nguyen et al. |

FOREIGN PATENT DOCUMENTS

| | | |
|---|---|---|
| CN | 108472711 A | 8/2018 |
| JP | 2008-040588 A | 2/2008 |
| JP | 2011-101900 A | 5/2011 |
| JP | 2015-170091 A | 9/2015 |
| JP | 2017-161981 A | 9/2017 |
| JP | 2017-530027 A | 10/2017 |

OTHER PUBLICATIONS

Z. Zhu et al., "A Novel Process Planning Approach for Hybrid Manufacturing Consisting of Additive, Subtractive and Inspection Processes", 2012 IEEE International Conference On Industrial Engineering and Engineering Management, IEEE, Dec. 10, 2012, pp. 1617-1621, XP032608131.
Donghong Ding et al., "A practical path planning methodology for wire and arc additive manufacturing of thin-walled structures", Robotics and Computer-Integrated Manufacturing, vol. 34, Aug. 1, 2015, pp. 8-19, XP055525533.

METHOD FOR SETTING EXCESS THICKNESS, DEVICE FOR SETTING EXCESS THICKNESS, METHOD FOR PRODUCING SHAPED OBJECT, AND PROGRAM

TECHNICAL FIELD

The present invention relates to an excess metal amount setting method, an excess metal amount setting device, a method for manufacturing a built object, and a program.

BACKGROUND ART

In recent years, there has been an increasing need for building using a 3D printer as a production unit, and research and development have been advanced toward practical use of building using a metal material. The 3D printer that builds a metal material melts a metal powder or a metal wire using a heat source such as a laser, an electron beam, or an arc, and deposits the molten metal to produce an additively-manufactured object.

When an arc is used as a heat source, a filler metal is melted and solidified by the arc to form a bead, and the bead is deposited in a plurality of layers to produce an additively-manufactured object. In a depositing procedure of the bead in this case, three-dimensional model data representing a shape of the additively-manufactured object is used, and an appropriate deposition plan corresponding to the shape is made.

As a technique for processing a built object, there has been a technique in which a deformation amount of a material after processing is analytically obtained by a material initial stress and a processing stress, and processing conditions (cutting, feeding, and cutting speed) are changed so that the calculated deformation amount does not exceed a limit value (for example, refer to Patent Literature 1). There also has been known a technique for accurately predicting a shape of a product after cutting in consideration of deformation of a material due to release of an internal stress to a shape of the material due to cutting even when the material has internal stress (see, for example, Patent Literature 2).

CITATION LIST

Patent Literature

Patent Literature 1: JP-A-2015-170091
Patent Literature 2: JP-A-2008-40588

SUMMARY OF INVENTION

Technical Problem

Incidentally, in additive manufacturing, since a material is melted and solidified to perform building, a residual stress is generated inside a built object due to thermal shrinkage. When an excess metal portion of the built object is cut and removed while the residual stress is generated, deformation occurs due to release of the residual stress, and an error occurs with respect to a target shape. Therefore, in order to prevent the error with respect to the target shape, rough processing and finish processing are performed after the excess metal amount is set to be large. However, when the excess metal amount is increased in consideration of release strain, a manufacturing cost and a manufacturing time are increased. Since it is necessary to leave a large cutting allowance in the rough processing for the finish processing, the machining time of the finish processing becomes long.

In the techniques described in Patent Literatures 1 and 2, a deformation amount of a material after processing is analytically obtained, and processing conditions (cutting, feeding, and cutting speed) are changed so that the calculated deformation amount does not exceed a limit value. Thus, a shape of a product after cutting is predictable in consideration of deformation of a material due to release of an internal stress. However, these techniques do not change a plan of additive manufacturing (pass, order of manufacturing, and the like) itself in accordance with the deformation amount after processing. For this reason, in manufacturing of an additively-manufactured object, it is difficult to reduce the manufacturing cost and the manufacturing time by adjusting the excess metal amount.

Accordingly, an object of the present invention is to provide an excess metal amount setting method, an excess metal amount setting device, a method for manufacturing a built object, and a program which are capable of increasing accuracy of building and machining and reducing a manufacturing cost and a manufacturing time.

Solution to Problem

In order to solve the above problem, deformation prediction and cutting release strain prediction of building are performed, and the respective deformation amounts are reflected in a building shape. Specifically, by reflecting the deformation amount due to building in the building shape, it is possible to perform building and machining with high accuracy in consideration of thermal deformation after building and release strain after machining.

The present invention includes the following configurations.

(1) An excess metal amount setting method for setting an excess metal amount of a deposited body in manufacturing the deposited body with weld beads formed by melting and solidifying a filler metal and forming a built object having a target shape by performing machining on the deposited body, the excess metal amount setting method including:
 a thermal shrinkage prediction step of predicting a thermal shrinkage amount in the deposited body after manufacturing;
 a thermal shrinkage modifying step of obtaining a thermal deformation modifying profile by expanding a target profile representing an outer edge of the target shape of the built object according to the thermal shrinkage amount;
 a release strain prediction step of predicting an elastic deformation amount due to release strain of the deposited body after the machining;
 an elastic deformation modifying step of obtaining an elastic deformation modifying profile by deforming the thermal deformation modifying profile according to the elastic deformation amount in a direction opposite to a deformation direction due to the release strain; and an excess metal amount setting step of adjusting an outer edge shape of the deposited body so that an excess metal amount from the elastic deformation modifying profile to an outer edge of the deposited body falls within a predetermined reference range.

(2) An excess metal amount setting device that sets that sets an excess metal amount of a deposited body in manufacturing the deposited body with weld beads formed by melting and solidifying a filler metal and forming a built object having a target shape by performing machining on the deposited body, the excess metal amount setting device including:
  a thermal shrinkage prediction unit configured to predict a thermal shrinkage amount after manufacturing;
  a thermal shrinkage modifying unit configured to obtain a thermal deformation modifying profile by expanding a target profile representing an outer edge of the target shape of the built object according to the thermal shrinkage amount;
  a release strain prediction unit configured to predict an elastic deformation amount due to release strain of the deposited body after the machining;
  a release strain modifying unit configured to obtain an elastic deformation modifying profile by deforming the thermal deformation modifying profile according to the elastic deformation amount in a direction opposite to a deformation direction due to the release strain; and an excess metal amount setting unit configured to adjust an outer edge shape of the deposited body so that an excess metal amount from the elastic deformation modifying profile to an outer edge of the deposited body falls within a predetermined reference range.
(3) A method for manufacturing a built object, including: additively manufacturing, with the weld beads, the deposited body designed by the excess metal amount setting method according to (1), performing the machining, and forming into the built object having the target shape.
(4) A program for causing a computer to execute a procedure of an excess metal amount setting method for setting an excess metal amount of a deposited body in manufacturing the deposited body with weld beads formed by melting and solidifying a filler metal and forming a built object having a target shape by performing machining on the deposited body, the program causing the computer to execute:
  a thermal shrinkage prediction procedure of predicting a thermal shrinkage amount in the deposited body after manufacturing;
  a thermal shrinkage modifying procedure of obtaining a thermal deformation modifying profile by expanding a target profile representing an outer edge of the target shape of the built object according to the thermal shrinkage amount;
  a release strain prediction procedure of predicting an elastic deformation amount due to release strain of the deposited body after the machining;
  an elastic deformation modifying procedure of obtaining an elastic deformation modifying profile by deforming the thermal deformation modifying profile according to the elastic deformation amount in a direction opposite to a deformation direction due to the release strain; and an excess metal amount setting procedure of adjusting an outer edge shape of the deposited body so that an excess metal amount from the elastic deformation modifying profile to an outer edge of the deposited body falls within a predetermined reference range.

Advantageous Effects of Invention

According to the present invention, it is possible to improve accuracy of building and machining, and to reduce a manufacturing cost and a manufacturing time.

DESCRIPTION OF EMBODIMENTS

Hereinafter, embodiments of the present invention are described in detail with reference to the drawings.

Figure 1:
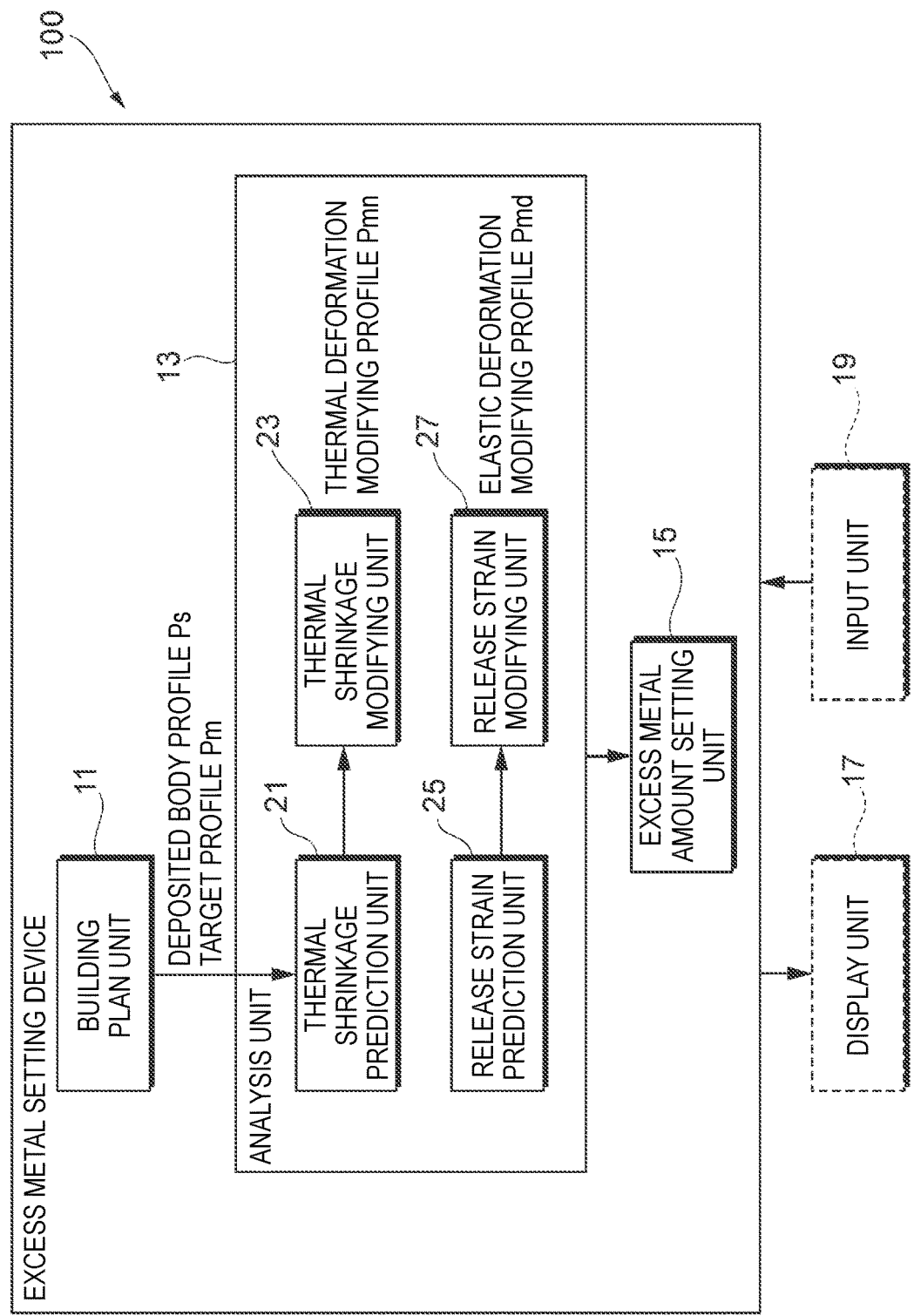
FIG. 1 is a block diagram showing an excess metal amount setting device according to the present invention.

FIG. 1 is a block diagram showing an excess metal amount setting device according to the present invention.

An excess metal amount setting device 100 of this configuration includes a building plan unit 11, an analysis unit 13, an excess metal amount setting unit 15, a display unit 17, and an input unit 19. The excess metal amount setting device 100 determines a procedure of additively manufacturing by overlapping weld beads using a welding device.

As will be described in detail below, the building plan unit 11 creates a target profile Pm representing an outer edge of a target shape of a built object produced by machining a deposited body obtained by additively manufacturing by overlapping weld beads, and a deposited body profile Ps representing an outer shape of the deposited body before machining.

The analysis unit 13 includes a thermal shrinkage prediction unit 21, a thermal shrinkage modifying unit 23, a release strain prediction unit 25, and a release strain modifying unit 27.

The thermal shrinkage prediction unit 21 predicts a thermal shrinkage amount after building of the deposited body obtained by additively manufacturing by overlapping weld beads.

The thermal shrinkage modifying unit 23 obtains a thermal deformation modifying profile Pmn obtained by expanding the target profile Pm representing the outer edge of the target shape of the built object according to the thermal shrinkage amount predicted by the thermal shrinkage prediction unit 21.

The release strain prediction unit 25 predicts an elastic deformation amount due to the release strain after machining the deposited body.

The release strain modifying unit 27 obtains an elastic deformation modifying profile Pmd obtained by deforming the thermal deformation modifying profile Pmn obtained by the thermal shrinkage modifying unit 23 in a direction opposite to a deformation direction due to the release strain according to the elastic deformation amount predicted by the release strain prediction unit 25.

The excess metal amount setting unit 15 adjusts an outer edge shape of the deposited body so that an excess metal amount from the elastic deformation modifying profile Pmd obtained by the release strain modifying unit 27 of the analysis unit 13 to the outer edge of the deposited body falls within a predetermined reference range.

The display unit 17 displays a building plan created by the building plan unit 11. The display unit 17 displays the deposited body profile Ps indicating the outer edge shape of the deposited body and at least one of the thermal deformation modifying profile Pmn and the elastic deformation modifying profile Pmd in an overlapping manner.

In the input unit 19, three-dimensional model data (CAD data or the like) representing a shape of an additively-manufactured object to be produced and various types of instruction information are input. The input unit 19 is configured such that a change instruction of a building region of the deposited body is inputted. When the change instruction is input from the input unit 19, the outer edge shape of the deposited body is changed according to the input change instruction, and the deposited body profile Ps of the changed deposited body is displayed on the display unit 17.

Welding deformation and residual stress of an additively-manufactured object are generally analyzed by thermoelastic plastic analysis method using a finite element method (FEM) or computer simulation using elastic analysis or the like.

In the thermoelastic plastic analysis method, since a phenomenon is calculated in consideration of various non-linear elements for each of a large number of minute time steps, the analysis may be performed with high accuracy. On the other hand, in the elasticity analysis, since the analysis is performed in consideration of only a linear element, the analysis may be performed in a short time When a built object is built by additive manufacturing in which beads are deposited, all portions of the built object undergo a metal melting and solidification process. When the metal is melted and solidified, intrinsic strain (plastic strain, thermal strain) occurs in the built object. The residual stress due to the inherent strain is generated inside the built object.

The analysis unit 13 analytically obtains a shape change due to such additive manufacturing. The analysis unit 13 may include, for example, a partial model thermoelastic analysis unit and an entire model elastic analysis unit.

The partial model thermoelastic analysis unit performs thermoelastic analysis using a partial model of the built object based on the input analysis conditions (additive manufacturing conditions and material physical property conditions) to calculate the intrinsic strain (plastic strain, thermal strain) (corresponding to the thermal shrinkage prediction unit 21 and the thermal shrinkage modifying unit 23).

The entire model elastic analysis unit performs elastic analysis on an entire model of the built object based on the calculated intrinsic strain to derive residual stress and the like (corresponding to the release strain prediction unit 25 and the release strain modifying unit 27).

Conditions used for the analysis include: additive manufacturing conditions using an output of a heat source, a type of the heat source, a beam profile, a scanning speed, a scanning sequence, a line offset, a preheating temperature, or the like as parameters; mechanical physical property values such as Young's modulus, a proof stress, a linear expansion coefficient, and a work hardening index of a material; and material physical property conditions such as a thermal physical property value such as thermal conductivity or specific heat.

Such an analysis process is executed by a computer in accordance with a program. That is, the analysis unit 13 may be configured as a computer including a processor such as a CPU, and a storage device such as a read only memory (ROM), a random access memory (RAM), a hard disk drive (HDD), and a solid state drive (SSD). In this case, a function of each unit shown in FIG. 1 may be implemented by the processor executing a predetermined program stored in the storage device.

Next, an example of the welding device that additively manufacturing a deposited body based on a building plan by the excess metal amount setting device 100 will be described.

Figure 2:
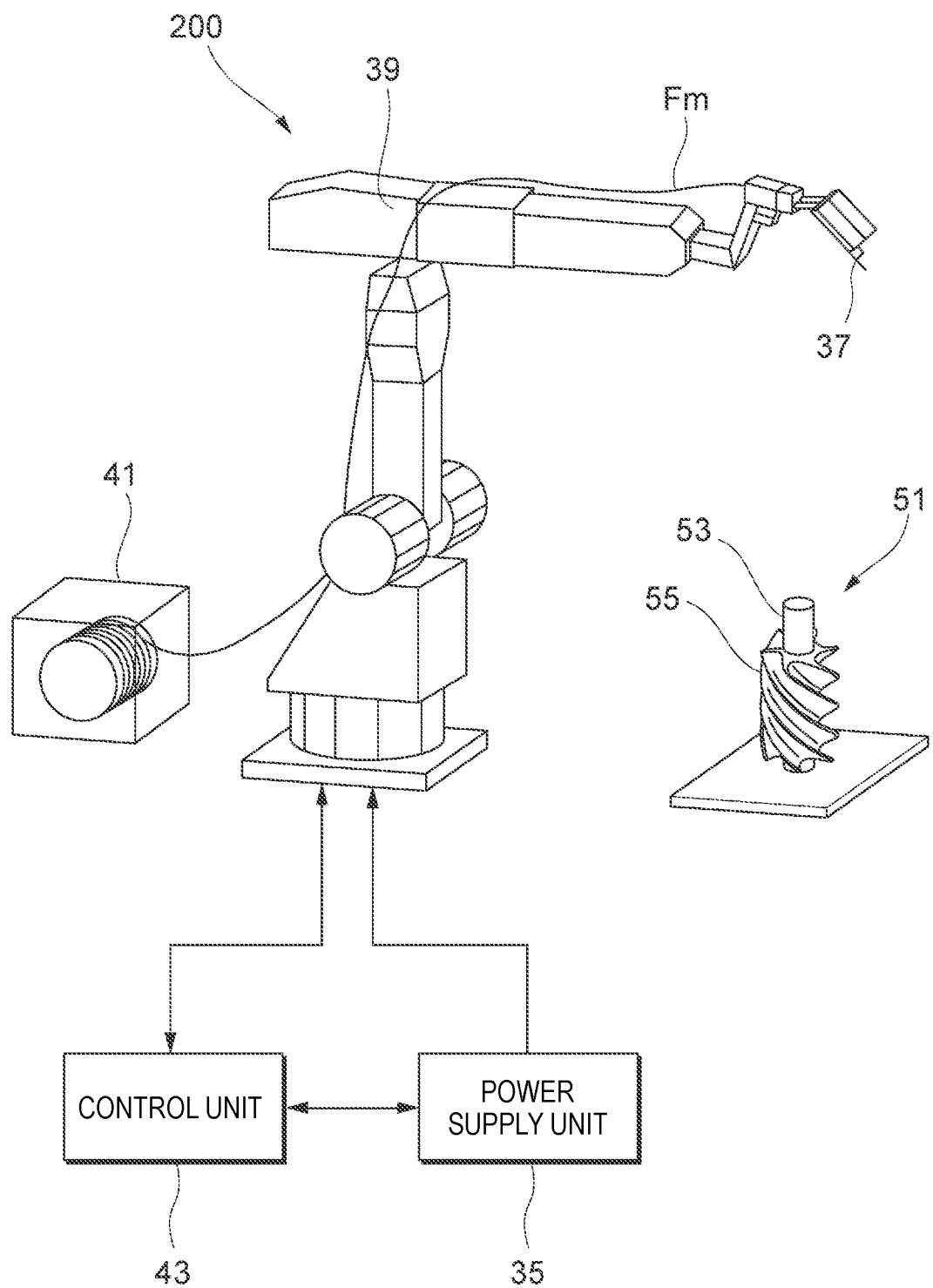
FIG. 2 is a schematic configuration diagram of a welding device.

FIG. 2 is a schematic configuration diagram of the welding device.

As the welding device 200, for example, an arc welding device shown in FIG. 2 or the like may be used.

The welding device 200 includes a power supply unit 35, a welding robot 39 which is a torch moving mechanism including a torch 37 provided on a tip shaft, a filler metal feeding unit 41 that feeds a filler metal (welding wire) Fm to the torch 37, and a control unit 43 that controls driving of the welding robot 39. The control unit 43 performs data communication with the excess metal amount setting device 100 via an interface.

The welding robot 39 is an articulated robot which has, for example, degrees of freedom on 6 axes, and in the torch 37 attached to the tip shaft of a robot arm, the filler metal Fm is supported such that the filler metal Fm may be continuously fed. A position or posture of the torch 37 may be set three-dimensionally desirably within a range of the degree of freedom of the robot arm.

The torch 37 generates an arc from a tip end of the filler metal Fm in a shielding gas atmosphere while holding the filler metal Fm. The torch 37 includes a shield nozzle (not shown), and shielding gas is fed from the shield nozzle. An arc welding method may be a consumable electrode type such as shielded metal arc welding or carbon dioxide gas arc welding or a non-consumable electrode type such as TIG welding or plasma arc welding, and is appropriately selected depending on an additively-manufactured object to be produced. For example, in the case of the consumable electrode type, a contact tip is disposed inside the shield nozzle, and the filler metal Fm to which a melting current is supplied is held on the contact tip.

Any commercially available welding wire may be used as the filler metal Fm. For example, MAG welding solid wires and MIG welding solid wires (JIS Z 3312) for mild steel, high tensile steel and cryogenic steel, and arc welding flux cored wires (JIS Z 3313) for mild steel, high tensile steel and cryogenic steel may be used.

The filler metal Fm is fed from the filler metal feeding unit 41 to the torch 37 by a drawing mechanism (not shown) attached to a robot arm or the like. Then, in response to a command from the control unit 43, the welding robot 39 melts and solidifies the continuously fed filler metal Fm while moving the torch 37. As a result, a bead, which is a molten solidified body of the filler metal Fm, is formed.

Specifically, when the control unit 43 executes a program, the welding robot 39, the power supply unit 35, and the like are driven in accordance with a programmed predetermined procedure. The welding robot 39 moves the torch 37 along a track or a locus programmed by the command from the control unit 43, and melts the filler metal Fm by the arc at a predetermined timing to form a bead at a desired position.

A heat source for melting the filler metal Fm is not limited to the above-described arc. The heat source using another system such as a heating system using an arc and a laser together, a heating system using plasma, or a heating system using an electron beam or a laser may be used. In the case of using an arc, beads may be easily formed regardless of a raw material and a structure while ensuring shielding properties. In the case of heating by an electron beam or a laser, a heating amount may be controlled more finely to keep each weld bead in a more proper state, thereby contributing to further improvement in quality of the additively-manufactured object.

Next, an example of the built object built using the welding device 200 will be described.

Figure 3:
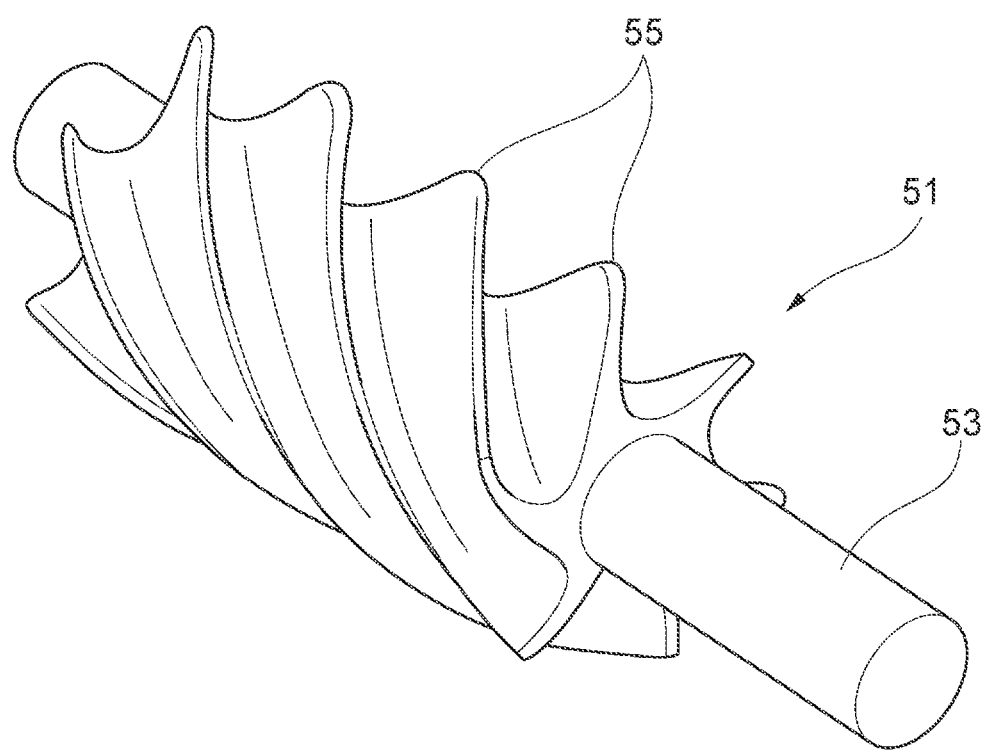
FIG. 3 is a perspective view of an additively-manufactured object manufactured by the welding device.
Figure 4:
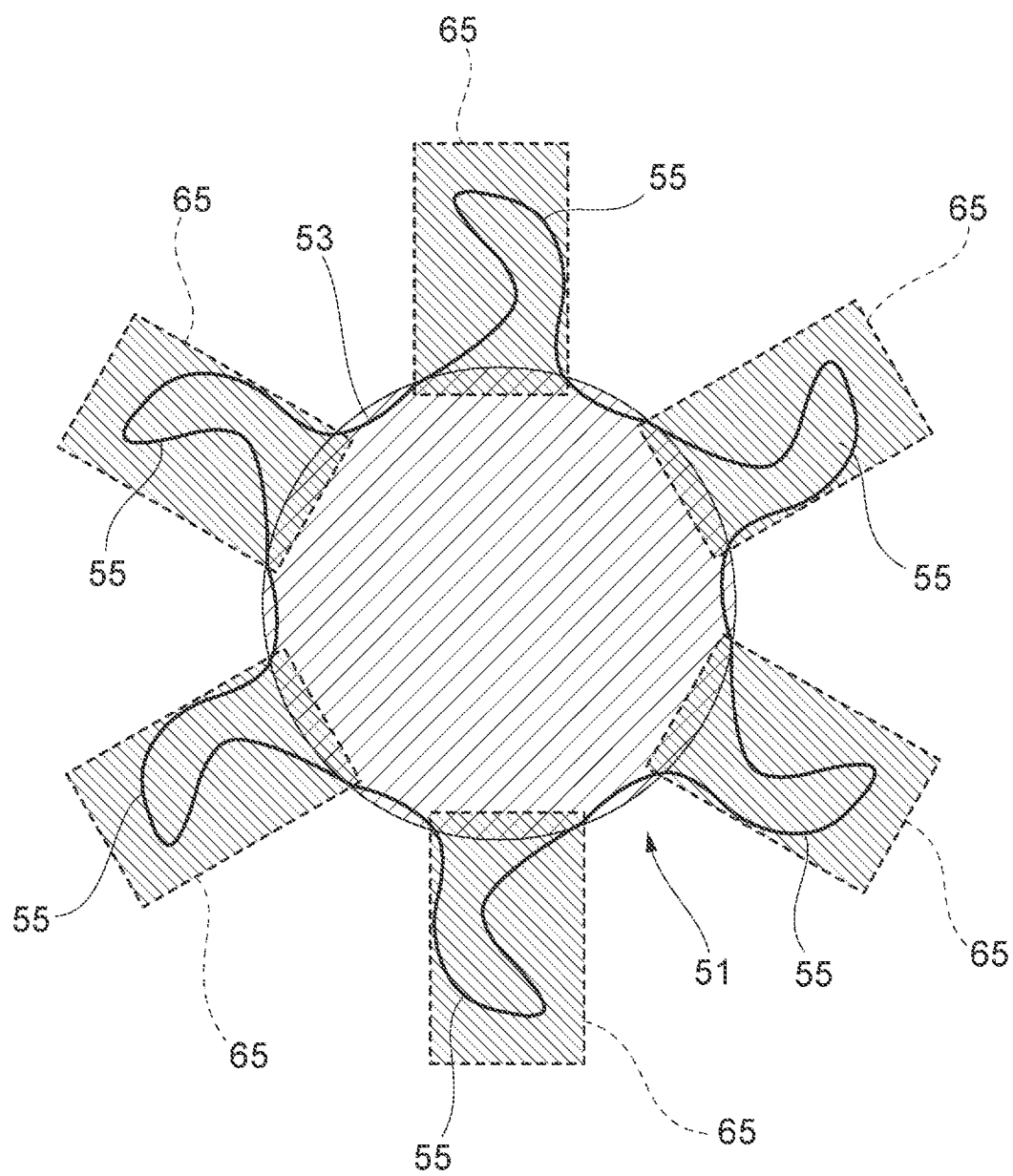
FIG. 4 is a cross-sectional view of the additively-manufactured object showing a deposited body and a built object in the additively-manufactured object.
Figure 5:
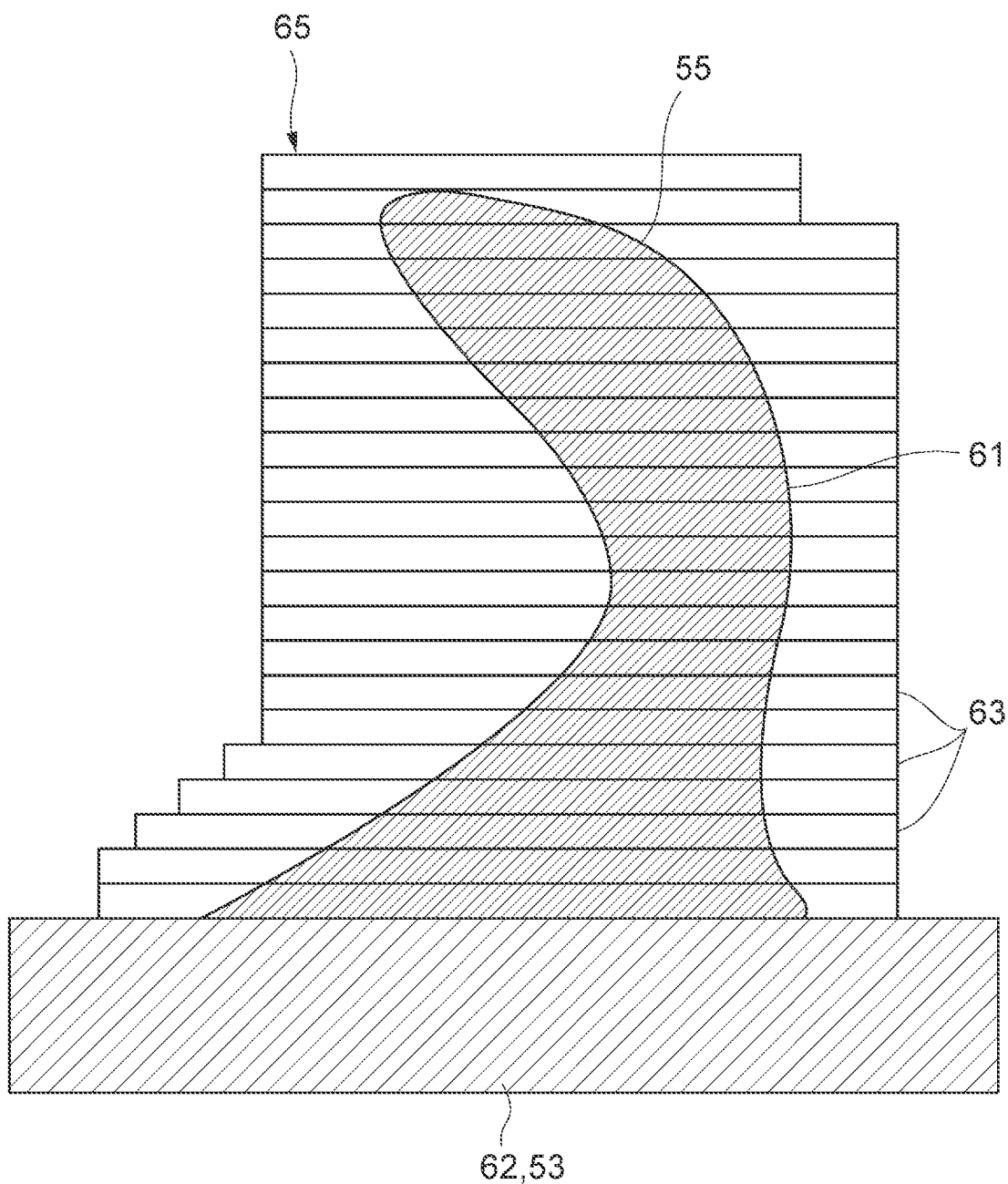
FIG. 5 is an illustrative view showing the deposited body and the built object which are built by the welding device, and is a cross-sectional view of one blade in FIG. 4.

FIG. 3 is a perspective view of an additively-manufactured object manufactured by the welding device. FIG. 4 is a cross-sectional view of the additively-manufactured object showing a deposited body and a built object in the additively-manufactured object. FIG. 5 is an illustrative view showing the deposited body and the built object which are built by the welding device, and is a cross-sectional view of one blade in FIG. 4.

As shown in FIGS. 3 and 4, an additively-manufactured object 51 shown as an example includes a cylindrical shaft body 53 and a plurality of (six in the shown example) spiral blades 55 protruding radially outward on an outer circumference of the shaft body 53. The plurality of blades 55 have a screw shape provided at equal intervals along a circumferential direction at an intermediate portion in an axial direction of the shaft body 53.

A built object 61 formed of the blades 55 shown in FIG. 5 is formed by building a deposited body 65 by depositing a plurality of layers of weld beads 63 on a base 62 to be the shaft body 53, and cutting the deposited body 65 by machining. The built object 61 has a portion having an overhang shape that is biased laterally toward a deposition direction of the weld beads 63.

Machining performed on the deposited body 65 include rough processing in which the deposited body 65 is cut with a rough cutting tool (or machine) and that is first performed, and finish processing in which the deposited body 65 is cut with a finishing tool (or machine) after the rough processing. Since the finish processing is performed at a slower cutting speed than the rough processing, a processing time per unit cutting amount is long.

Next, a procedure of excess metal setting by the excess metal amount setting device 100 will be described.

Figure 6:
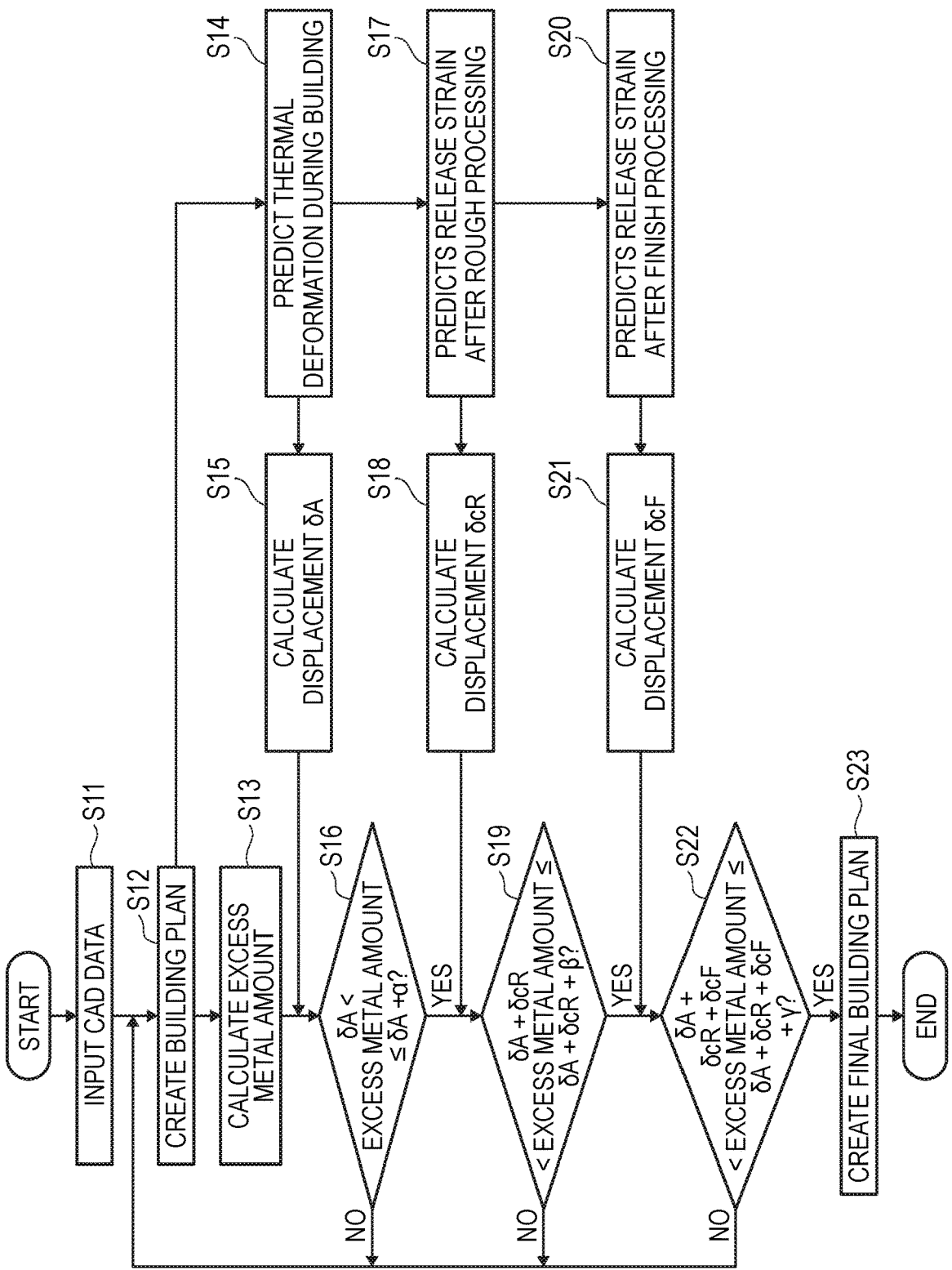
FIG. 6 is a flow chart showing a procedure until a building plan of the built object is created.
Figure 7:
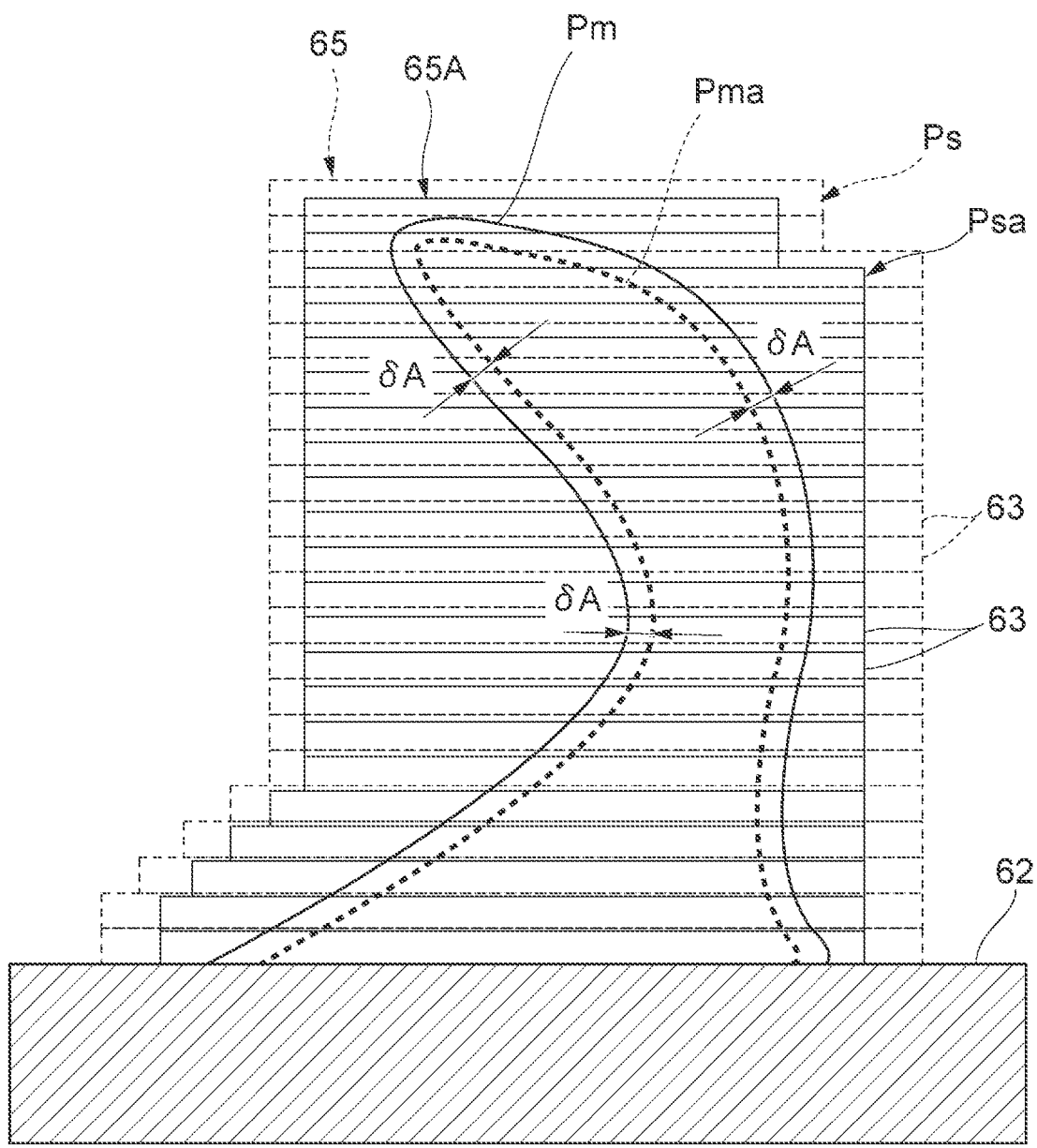
FIG. 7 is an illustrative view showing a state of thermal shrinkage of the deposited body and the built object.
Figure 8:
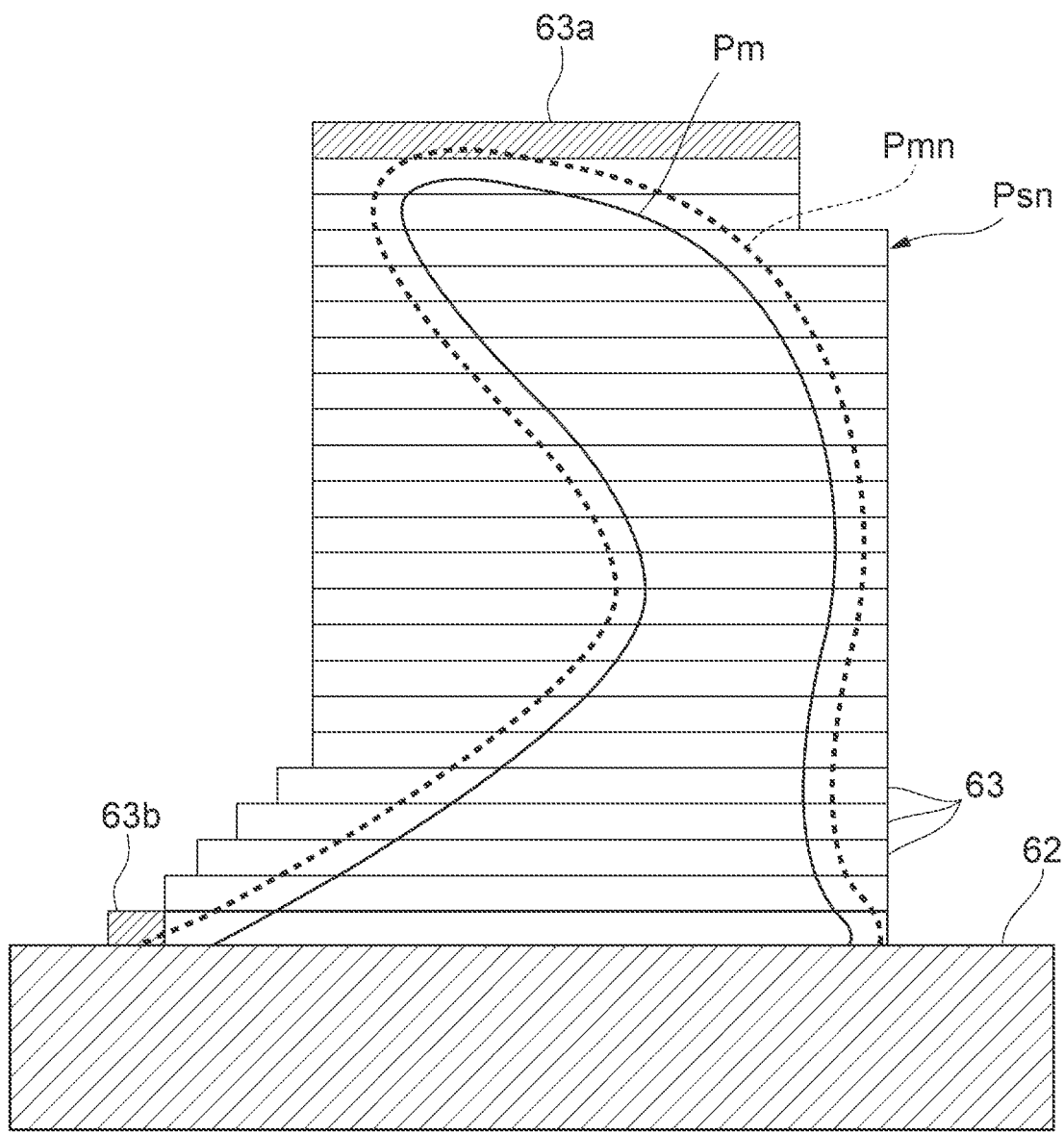
FIG. 8 is an illustrative view showing thermal shrinkage modifying of the built object.
Figure 9:
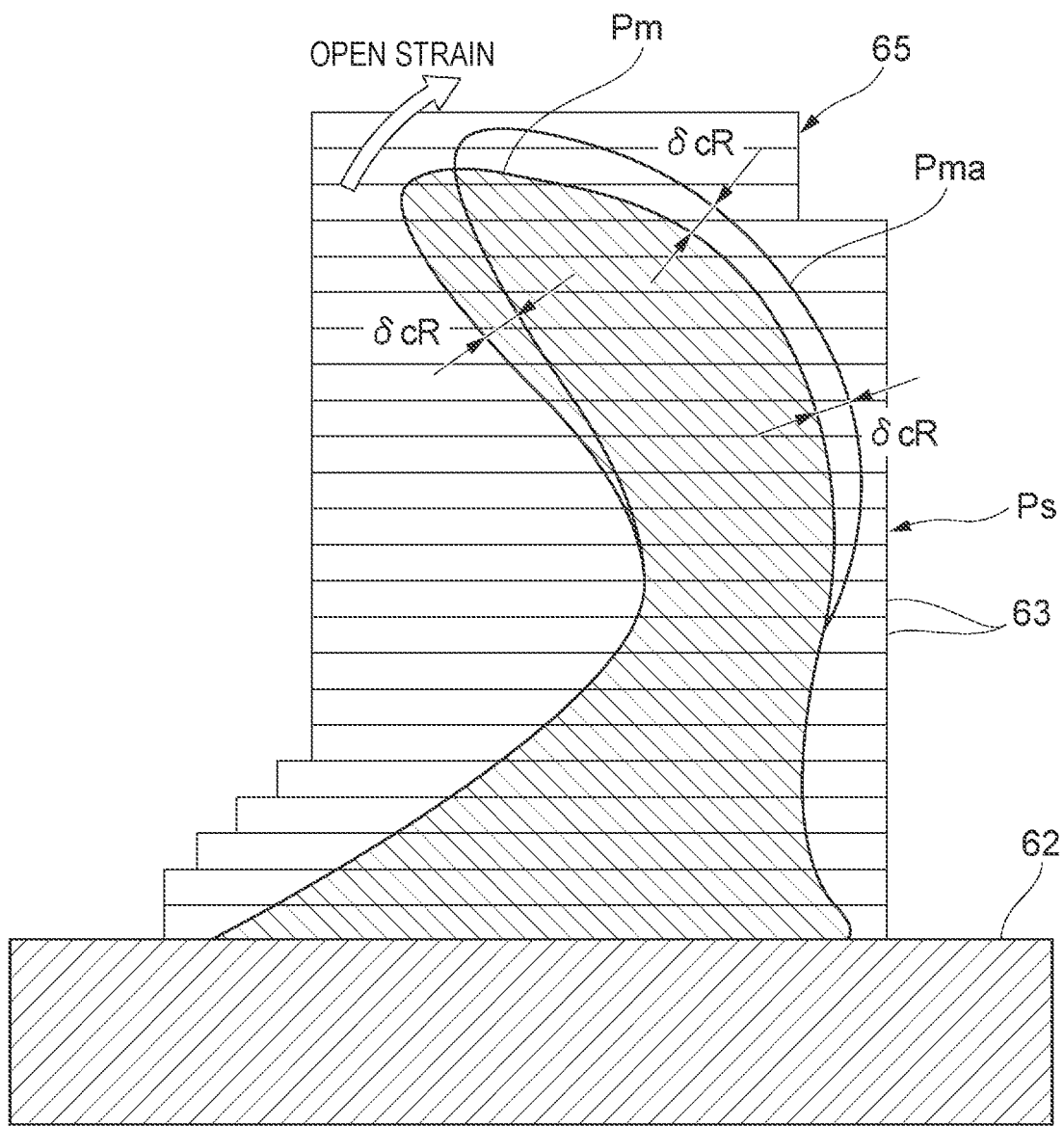
FIG. 9 is an illustrative view showing a state of release strain of the built object.
Figure 10:
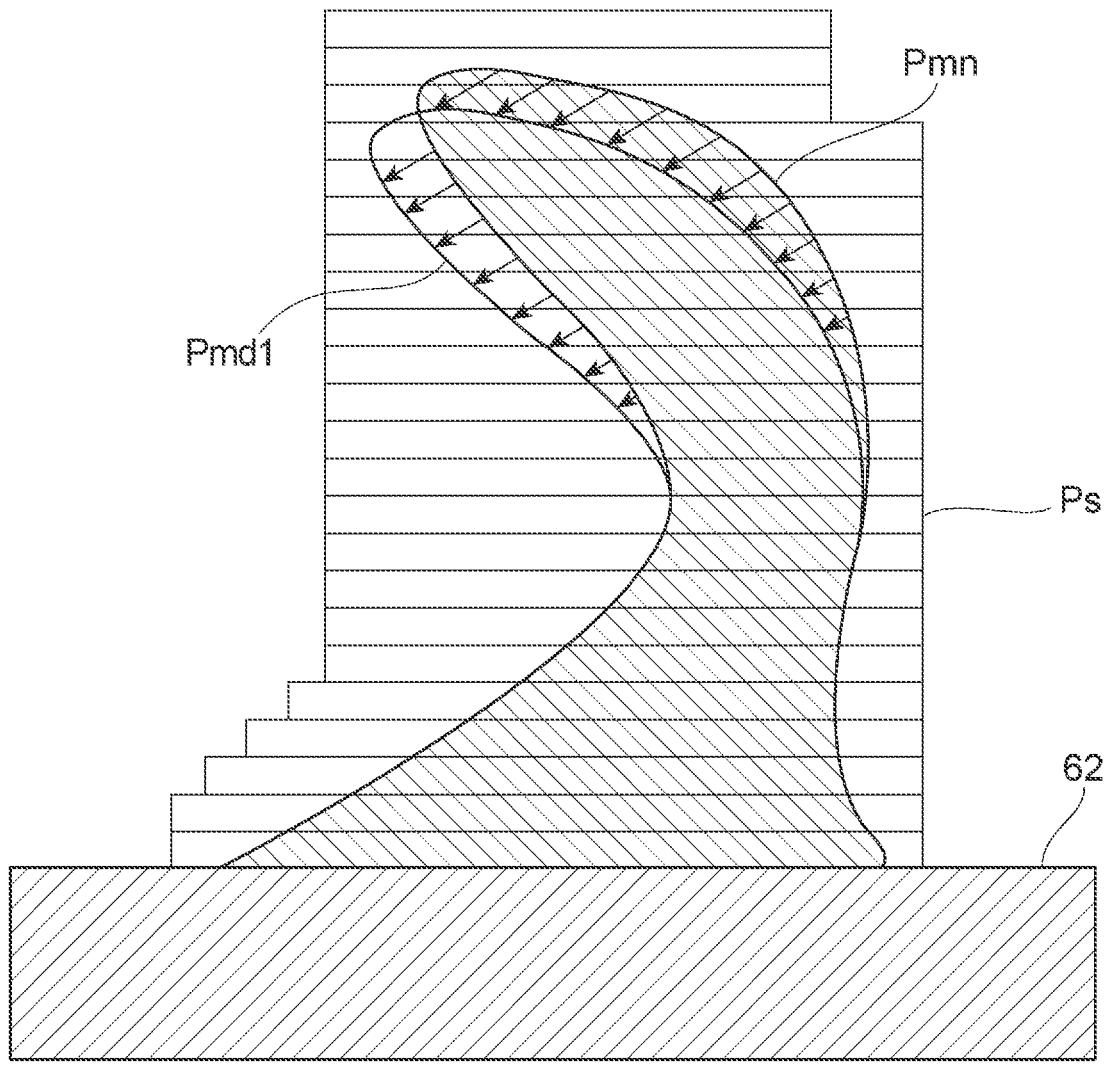
FIG. 10 is an illustrative view showing release strain modifying of the built object.
Figure 11:
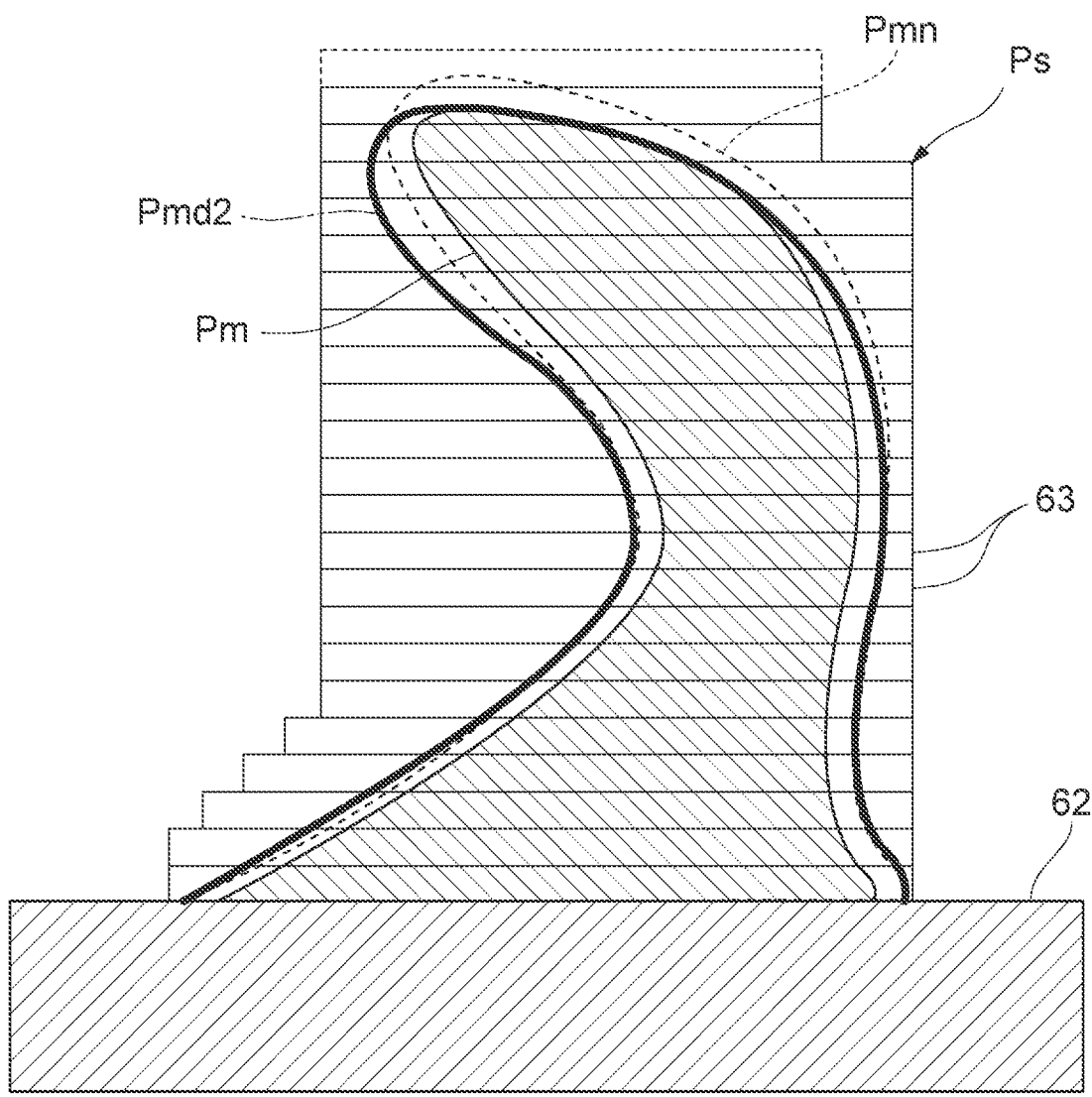
FIG. 11 is an illustrative view showing a modifying content of an excess metal amount by an excess metal setting method in an overlapping manner.

FIG. 6 is a flow chart showing a procedure until the building plan of the built object is created. FIG. 7 is an illustrative view showing a state of thermal shrinkage of the deposited body and the built object. FIG. 8 is an illustrative view showing thermal shrinkage modifying of the built object. FIG. 9 is an illustrative view showing a state of release strain of the built object. FIG. 10 is an illustrative view showing release strain modifying of the built object. FIG. 11 is an illustrative view showing modifying of an excess metal amount by an excess metal setting method according to the present invention. As shown in FIGS. 1 and 6, first, CAD data, which is three-dimensional model data representing a shape of the built object 61, is input from the input unit 19 (S11). The CAD data includes various types of dimensional information such as coordinates of the outer edge of the built object 61, as well as information such as a type of material and final finishing to be referred to as necessary.

Next, the building plan unit 11 creates the building plan based on the CAD data input from the input unit 19 (S12). Specifically, the deposited body profile Ps representing the outer shape of the deposited body 65 obtained by additively manufacturing by overlapping the weld beads 63 shown in FIG. 7, and the target profile Pm representing the outer edge of the target shape of the built object 61 produced by machining the deposited body 65 are created. Further, the building plan unit 11 calculates the excess metal amount to be provided around the building body before the machining is performed, based on the created deposited body profile Ps and the target profile Pm (S13).

As shown in FIG. 7, the deposited body 65 formed of the weld beads 63 is thermally shrunk by being cooled after building (see a shrunk deposited body 65A). That is, the deposited body profile Ps representing the outer shape of the deposited body 65 shrinks (see a shrunk deposited body profile Psa), and accordingly, the target profile Pm also shrinks (see a shrunk profile Pma). Therefore, the thermal shrinkage prediction unit 21 of the analysis unit 13 predicts thermal deformation of the deposited body profile Ps after the building in the deposited body 65 in which the weld beads 63 are additively manufactured (S14), and further calculates a displacement δA which is a thermal shrinkage amount of the target profile Pm due to the thermal deformation (S15).

Then, as shown in FIG. 8, the thermal shrinkage modifying unit 23 of the analysis unit 13 obtains the thermal deformation modifying profile Pmn obtained by expanding the target profile Pm according to the thermal shrinkage amount. Next, the excess metal amount setting unit 15 compares the excess metal amount calculated by the building plan unit 11 with the displacement δA which is the thermal shrinkage amount predicted by the thermal shrinkage prediction unit 21. Then, it is determined whether the excess metal amount is larger than the displacement δA and equal to or smaller than allowable displacement δA+α obtained by adding an allowable amount α (δA<excess metal amount≤δA+α) (S16). Here, the allowable amount α is a value set in advance so as to minimize machining of excessive excess metal by providing an upper limit to the excess metal amount.

When the excess metal amount calculated by the building plan unit 11 is larger than the displacement δA and does not satisfy a condition of the allowable displacement δA+α or less, the excess metal amount is modified to satisfy this condition. Then, the building plan unit 11 newly creates the deposited body profile Ps in which the modified excess metal amount is added to the thermal deformation modifying profile Pmn. When the excess metal amount before modifying is larger than the displacement δA and satisfies the condition of the allowable displacement δA+α or less, the deposited body profile Ps including the excess metal amount is maintained. That is, since it is not necessary to increase or decrease the deposited body profile Ps, the deposited body profile Ps is maintained as it is.

However, as shown in FIG. 8, by modifying into the thermal deformation modifying profile Pmn, a part of the thermal deformation modifying profile Pmn may protrude from the uppermost portion of the deposited body profile Ps as originally produced, and the excess metal may not be secured. By modifying into the thermal deformation modifying profile Pmn, for example, a length in a part of the weld bead 63 of a first layer of the deposited body profile Ps may be insufficient, and the excess metal may not be secured. In such a case, the building plan unit 11 newly creates the deposited body profile Ps by adding a weld bead 63a of one layer to the uppermost portion or adding a weld bead 63b obtained by extending the weld bead 63 on a first layer portion (adding the weld beads 63a and 63b in hatched portions in FIG. 8). When the deposited body profile Ps is corrected, the excess metal amount of the weld bead 63 in the deposition direction is set to be equal to or less than a thickness of one layer of the weld bead 63.

Further, as shown in FIG. 9, the deposited body 65 formed of the weld beads 63 is subjected to the rough processing by machining, so that residual stress is released and the deposited body 65 is deformed. That is, the hatched Pm in FIG. 9 is transformed into the non-hatched Pma. Therefore, the thermal deformation modifying profile Pmn modified by the thermal shrinkage modifying unit 23 described above is also deformed due to the release strain.

Therefore, the release strain prediction unit 25 of the analysis unit 13 predicts deformation after the rough processing (S17), and calculates a displacement δcR which is an elastic deformation amount (first elastic deformation amount) of the thermal deformation modifying profile Pmn due to this deformation (S18). Then, as shown in FIG. 10, the release strain modifying unit 27 of the analysis unit 13 deforms the thermal deformation modifying profile Pmn in the direction opposite to the deformation direction due to the release strain according to the elastic deformation amount to obtain a first elastic deformation modifying profile Pmd1. Next, the excess metal amount setting unit 15 compares the excess metal amount calculated by the building plan unit 11 with a displacement $\delta A+\delta cR$ including the displacement $\delta cR$ which is the elastic deformation amount predicted by the release strain prediction unit 25.

Then, it is determined whether the excess metal amount is larger than the displacement $\delta A+\delta cR$ and equal to or smaller than an allowable displacement $\delta A+\delta cR+\beta$ obtained by adding a preset allowable amount β ($\delta A+\delta cR$<excess metal amount≤$\delta A+\delta cR+\beta$) (S19). Here, the allowable amount ß is a value set in advance so as to minimize the machining of excessive excess metal by providing an upper limit to the excess metal amount.

When the excess metal amount calculated by the building plan unit 11 is larger than the displacement $\delta A+\delta cR$ and does not satisfy a condition of the allowable displacement $\delta A+\delta cR+\beta$ or less, the excess metal amount is modified to satisfy this condition. The building plan unit 11 newly creates the deposited body profile Ps in which the modified excess metal amount is added to the first elastic deformation modifying profile Pmd1. When the excess metal amount before modifying is larger than the displacement $\delta A+\delta cR$ and satisfies the condition of the allowable displacement $\delta A+\delta cR+\beta$ or less, the deposited body profile Ps including the excess metal amount is maintained.

Even when the finish processing is performed after the rough processing, the residual stress is released and the elastic deformation modifying profile Pmd1 is slightly deformed. In other words, the elastic deformation modifying profile Pmd1 is deformed by the release strain in the finish processing. Therefore, the release strain prediction unit 25 of the analysis unit 13 predicts deformation after the finish processing (S20), and calculates a displacement δcF which is an elastic deformation amount (second elastic deformation amount) of the first elastic deformation modifying profile Pmd1 due to the deformation (S21).

Figure 12:
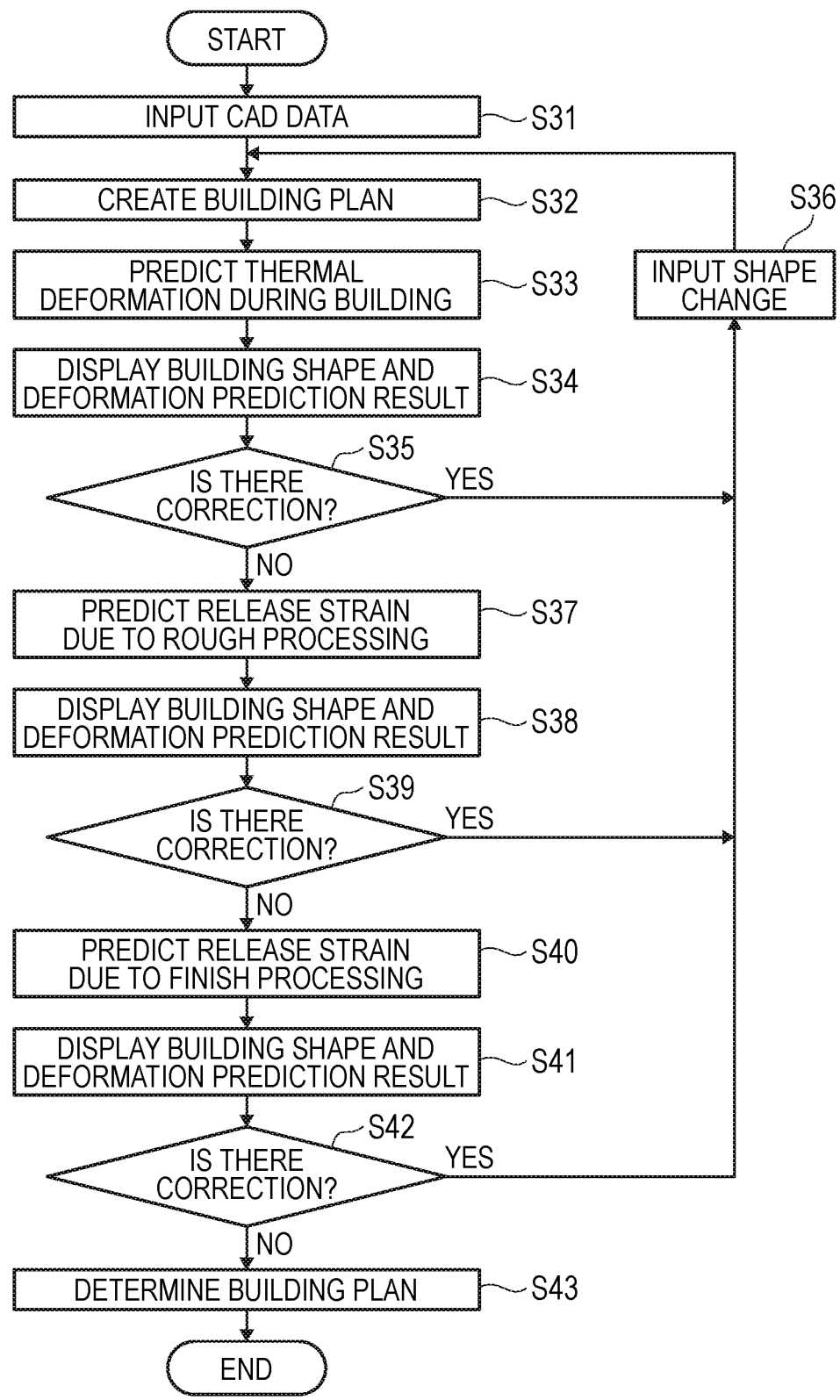
FIG. 12 is a flow chart showing a procedure until a building plan of the built object is created in a case where manual correction is performed.

In the same manner as described above, the release strain modifying unit 27 of the analysis unit 13 deforms the first elastic deformation modifying profile Pmd1 in the direction opposite to the deformation direction due to the release strain according to the elastic deformation amount to obtain a second elastic deformation modifying profile Pmd2 (see FIG. 12). Next, the excess metal amount setting unit 15 compares the excess metal amount calculated by the building plan unit 11 with a displacement $\delta A+\delta cR+\delta cF$ including a displacement $\delta cF$ which is an elastic deformation amount predicted by the release strain prediction unit 25. Then, it is determined whether the excess metal amount is larger than the displacement $\delta A+\delta cR+\delta cF$ and equal to or smaller than an allowable displacement $\delta A+\delta cR+\delta cF+\gamma$ obtained by adding a preset allowable amount γ ($\delta A+\delta cR+\delta cF$<excess metal amount≤ $\delta A+\delta cR+\delta cF+\gamma$) (S22). Here, the allowable amount γ is a value set in advance so as to minimize the machining of excessive excess metal by providing an upper limit to the excess metal amount.

When the excess metal amount calculated by the building plan unit 11 is larger than the displacement $\delta A+\delta cR+\delta cF$ and does not satisfy a condition of the allowable displacement $\delta A+\delta cR+\delta cF+\gamma$ or less, the excess metal amount is modified to satisfy this condition. Then, the building plan unit 11 newly creates the deposited body profile Ps in which the modified excess metal amount is added to the second elastic deformation modifying profile Pmd2. When the excess metal amount before modifying is larger than the displacement $\delta A+\delta cR+\delta cF$ and satisfies the condition of the allowable displacement $\delta A+\delta cR+\delta cF+\gamma$ or less, the deposited body profile Ps including the excess metal amount is maintained.

After the second elastic deformation modifying profile Pmd2 is obtained in this manner, the excess metal amount setting unit 15 creates, as a final building plan, the deposited body profile Ps in which the excess metal is adjusted to the second elastic deformation modifying profile Pmd2.

FIG. 11 is an illustrative view showing the respective profiles of the deposited body in an overlapping manner. The excess metal amount setting device 100 creates the thermal deformation modifying profile Pmn in which the displacement $\delta A$ due to the thermal shrinkage is reflected on the target profile Pm, and creates the second elastic deformation modifying profile Pmd2 in which the displacement $\delta cR$ and the displacement $\delta cF$ due to the machining are reflected on the thermal deformation modifying profile Pmn. Then, the deposited body profile Ps (outer edge of the weld bead 63 indicated by a solid line in FIG. 11) in which the excess metal amount is adjusted to the second elastic deformation modifying profile Pmd2 is created.

As described above, according to the above control, the target profile Pm representing the outer edge of the target shape is expanded according to the predicted thermal shrinkage amount, and is further deformed according to the predicted elastic deformation amount of the release strain due to the machining, so that the excess metal amount may be appropriately set. As a result, highly accurate building and machining may be performed in consideration of the thermal deformation after building and the release strain after machining, and machining efficiency may be increased by reducing the time required for the machining.

As a result, when the built object 61 is built by depositing the weld beads 63 by melting the filler metal Fm using the arc as the heat source, the built object 61 may be built with high accuracy in consideration of the influence of the heat of the weld beads 63.

By setting the excess metal amount in consideration of the release strain in the rough processing and the release strain in the finish processing, it is possible to perform finer excess metal adjustment and to perform building with higher accuracy.

By adjusting the number of weld beads 63 and a bead length according to the excess metal amount, the set excess metal amount may be reliably ensured.

By setting the excess metal amount of the weld beads 63 in the deposition direction to be equal to or less than the thickness of one layer of the weld beads 63, a wasted portion of the weld beads 63 to be deposited is prevented as much as possible, and the built object may be efficiently built.

In particular, when the built object 61 that has the portion having the overhang shape in which the influence of the release strain due to the machining is remarkably generated is built, the excess metal amount may be appropriately set in consideration of the release strain. Therefore, the built object 61 that has the portion having the overhang shape may be built with high accuracy.

Although in the method described above, the building plan is automatically created, an artificial adjustment may be added.

Next, a method of artificially adjusting the building plan will be described.

FIG. 12 is a flow chart showing a procedure until the building plan of the built object is created in a case where manual correction is performed.

When the CAD data, which is three-dimensional model data representing the shape of the built object 61, is input from the input unit 19 (S31), the building plan unit 11 creates a building plan based on the CAD data (S32).

The thermal shrinkage prediction unit 21 of the analysis unit 13 predicts the thermal deformation of the building shape of the deposited body 65 in the created building plan (S33). Then, the deposited body profile Ps, which is a building shape of the deposited body 65 created by the building plan unit 11, and the thermal deformation modifying profile Pmn in which the predicted thermal shrinkage is reflected on the target profile Pm are displayed on the display unit 17 in an overlapping manner (S34).

An operator determines whether it is necessary to correct the excess metal amount based on the building shape displayed on the display unit 17 (S35). When it is determined that the excess metal amount needs to be corrected, the input unit 19 is operated to issue the change instruction to correct the deposited body profile Ps (S36). The building plan unit 11 changes the outer edge shape of the deposited body 65 according to the input change instruction, and displays the changed deposited body profile Ps of the deposited body 65 on the display unit 17.

Next, the release strain prediction unit 25 of the analysis unit 13 predicts the release strain due to the rough processing of the deposited body 65 (S37). Then, the deposited body profile Ps and the first elastic deformation modifying profile Pmd1 reflecting the predicted elastic deformation in the thermal deformation modifying profile Pmn are displayed on the display unit 17 in an overlapping manner (S38).

The operator determines whether it is necessary to correct the excess metal amount based on the building shape displayed on the display unit 17 (S39). As a result, when it is determined that the excess metal amount needs to be corrected, the input unit 19 is operated to issue the change instruction to correct the deposited body profile Ps (S36).

The building plan unit 11 changes the outer edge shape of the deposited body 65 according to the input change instruction, and displays the changed deposited body profile Ps of the deposited body 65 on the display unit 17.

Next, the release strain prediction unit 25 of the analysis unit 13 predicts the release strain due to the finish processing after the rough processing (S40). Then, the deposited body profile Ps and the second elastic deformation modifying profile Pmd2 reflecting the predicted elastic deformation in the first elastic deformation modifying profile Pmd1 are displayed on the display unit 17 in an overlapping manner (S41).

The operator determines whether it is necessary to correct the excess metal amount based on the building shape displayed on the display unit 17 (S42). As a result, when it is determined that the excess metal amount needs to be corrected, the input unit 19 is operated to issue the change instruction to correct the deposited body profile Ps (S36). The building plan unit 11 changes the outer edge shape of the deposited body 65 according to the input change instruction, and displays the changed deposited body profile Ps of the deposited body 65 on the display unit 17.

The deposited body profile Ps, which is the building shape of the deposited body 64 in which the thermal shrinkage, the release strain due to the rough processing, and the release strain due to the finish processing are reflected, is determined as the final building plan (S43).

As described above, the operator manually inputs the change instruction from the input unit 19 as necessary while checking display of the display unit 17, so that the final building plan in which the thermal shrinkage, the release strain due to the rough processing, and the release strain due to the finish processing are reflected may be changed based on an experience of the operator. Therefore, the building plan may be created more efficiently. Further, a changed state may be easily confirmed from the display of the changed deposited body profile Ps of the deposited body 65 displayed on the display unit 17.

As described above, the present invention is not limited to the above embodiments, and combinations of the respective configurations of the embodiments, or changes and applications made by those skilled in the art based on the description of the specification and the well-known technology are also intended by the present invention and are included within the scope to be protected.

The present invention is suitable for use in manufacturing a built object having an overhang shape such as the blade 55, but the built object is not limited to the blade 55.

Figure 13:
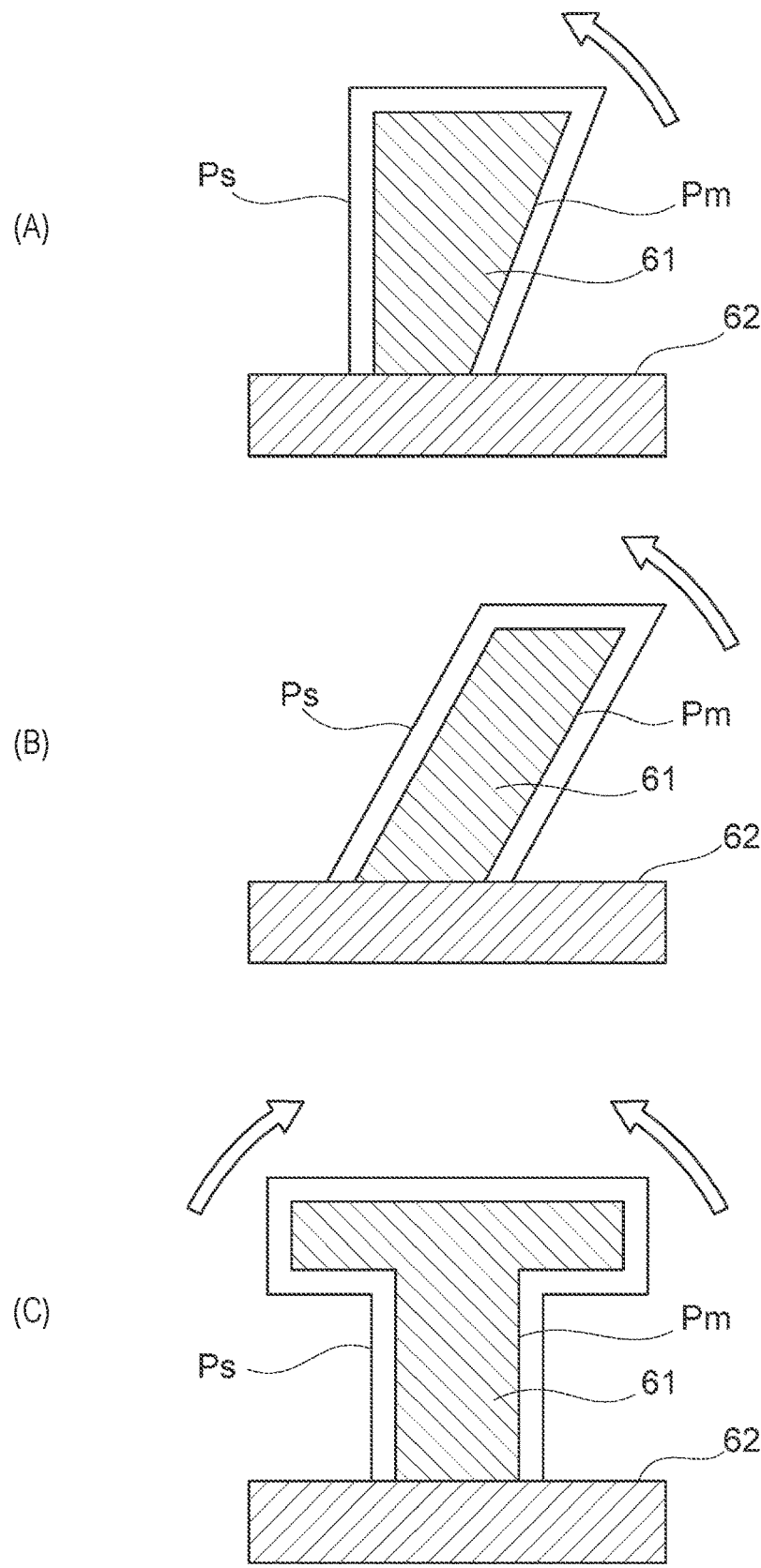
FIG. 13 is a diagram showing another example of a built object, in which (A) to (C) are schematic cross-sectional views of the built object.

For example, the present invention is suitable for use in a building plan of a built object that is likely to be elastically restored, such as the built object 61 having an overhang shape in which one side surface is gradually inclined in a direction away from the other side surface toward an upper side as shown in (A) in FIG. 13, or the built object 61 in which both side surfaces are inclined in the same direction toward the upper side as shown in (B) in FIG. 13. As shown in (C) in FIG. 13, in the built object 61 having a T-shape in a cross-sectional view and having extending portions protruding to both sides in an upper portion, the extending portions are warped upward. Therefore, the present invention may also be suitably used for such a built object 61.

In the above example, an entire building region of the built object 61 including the portion having the overhang shape is adjusted by the excess metal setting method according to the present invention, but the excess metal adjustment of the building region of only the portion having the overhang shape may be performed. In this case, since the excess metal of the building region of only the portion having the overhang shape is adjusted, the time required for adjusting the excess metal may be shortened.

In the above example, the excess metal amount setting device 100 is provided in a computer provided separately from the welding device 200, and the computer generates a program for driving the welding device 200 based on the building plan of the set excess metal amount. The excess metal amount setting device 100 is not limited to such an aspect, and may be provided in the control unit 43 of the welding device 200 shown in FIG. 2.

As discussed above, followings are disclosed in this specification.

(1) An excess metal amount setting method for setting an excess metal amount of a deposited body in manufacturing the deposited body with weld beads formed by melting and solidifying a filler metal and forming a built object having a target shape by performing machining on the deposited body, the excess metal amount setting method including:
- a thermal shrinkage prediction step of predicting a thermal shrinkage amount in the deposited body after manufacturing;
- a thermal shrinkage modifying step of obtaining a thermal deformation modifying profile by expanding a target profile representing an outer edge of the target shape of the built object according to the thermal shrinkage amount;
- a release strain prediction step of predicting an elastic deformation amount due to release strain of the deposited body after the machining;
- an elastic deformation modifying step of obtaining an elastic deformation modifying profile by deforming the thermal deformation modifying profile according to the elastic deformation amount in a direction opposite to a deformation direction due to the release strain; and
- an excess metal amount setting step of adjusting an outer edge shape of the deposited body so that an excess metal amount from the elastic deformation modifying profile to an outer edge of the deposited body falls within a predetermined reference range.

According to the excess metal amount setting method, the target profile representing the outer edge of the target shape is expanded according to the predicted thermal shrinkage amount, and is further deformed according to the predicted elastic deformation amount of the release strain due to the machining, so that the excess metal amount may be appropriately set. As a result, highly accurate manufacturing and machining may be performed in consideration of the thermal deformation after manufacturing and the release strain after machining, and machining efficiency may be increased by reducing the time required for the machining.

(2) In the above excess metal amount setting method, the machining may include rough processing and finish processing,
- in the release strain prediction step, a first elastic deformation amount caused by release strain due to the rough processing and a second elastic deformation amount caused by release strain due to the finish processing may be predicted respectively, and,
- in the elastic deformation modifying step, a first elastic deformation modifying profile obtained by deforming the thermal deformation modifying profile according to the first elastic deformation amount and a second elastic deformation modifying profile obtained by deforming the first elastic deformation modifying profile according to the second elastic deformation amount may be obtained.

According to the excess metal amount setting method, by setting the excess metal amount in consideration of the release strain in the rough processing and the release strain in the finish processing, it is possible to perform finer excess metal adjustment and to perform manufacturing with higher accuracy.

(3) In the above excess metal amount setting method, in the excess metal amount setting step, in a case where the excess metal amount does not fall within the reference range, the outer edge shape of the deposited body may be adjusted by changing at least one of the number of weld beads and a bead length.

According to the excess metal amount setting method, by adjusting the number of weld beads and the bead length according to the excess metal amount, the set excess metal amount may be reliably ensured.

(4) In the above excess metal amount setting method, in the excess metal amount setting step, the excess metal amount in a deposition direction of the weld bead may be set to be equal to or less than a thickness of one layer of the weld bead.

According to the excess metal amount setting method, by setting the excess metal amount of the weld beads in the deposition direction to be equal to or less than the thickness of one layer of the weld beads, a wasted portion of the weld beads to be deposited is prevented as much as possible, and the built object may be efficiently manufactured.

(5) In the above excess metal amount setting method, the built object may have a portion having an overhang shape in a deposition direction of the weld bead.

According to the excess metal amount setting method, when the built object that has the portion having the overhang shape in which the influence of the release strain due to the machining remarkably occurs is manufactured, the excess metal amount may be appropriately set in consideration of the release strain. Therefore, the built object that has the portion having the overhang shape may be manufactured with high accuracy.

(6) In the above excess metal amount setting method, the outer edge shape of the deposited body may be adjusted only in a portion of the deposited body that becomes the overhang shape of the built object.

According to the excess metal amount setting method, when the portion having the overhang shape in which the influence of the release strain due to the machining is remarkably generated is manufactured, the excess metal amount may be appropriately set in consideration of the release strain. Therefore, the portion having the overhang shape may be manufactured with high accuracy. Since the excess metal of the building region of only the portion having the overhang shape is adjusted, the time required for adjusting the excess metal may be shortened.

(7) In the above excess metal amount setting method, the weld bead may be formed by melting the filler metal using an arc as a heat source.

According to the excess metal amount setting method, when the built object is manufactured by depositing the weld beads by melting the filler metal Fm using the arc as the heat source, the built object may be manufactured with high accuracy in consideration of the influence of the heat of the weld bead.

(8) In the above excess metal amount setting method may further include:
- a displaying step of displaying, in an overlapping manner, a deposited body profile representing an outer edge shape of the deposited body and at least one of the thermal deformation modifying profile and the elastic deformation modifying profile on a display unit;
an input step of receiving a change instruction of a building region of the deposited body; and
a displaying step of displaying, on the display unit, the deposited body profile of the deposited body obtained by changing the outer edge shape of the deposited body according to the input change instruction.

According to the excess metal amount setting method, it is possible to confirm at least one of the thermal deformation modifying profile and the elastic deformation modifying profile which are displayed on the deposited body profile displayed on the display unit in an overlapping manner, and input the change instruction of the building region of the deposited body. As a result, it may be possible to efficiently create the building plan in which the thermal shrinkage and the release strain due to the machining are reflected. A changed state may be easily confirmed from the display of the changed deposited body profile of the deposited body displayed on the display unit.

(9) An excess metal amount setting device that sets that sets an excess metal amount of a deposited body in manufacturing the deposited body with weld beads formed by melting and solidifying a filler metal and forming a built object having a target shape by performing machining on the deposited body, the excess metal amount setting device including:
a thermal shrinkage prediction unit configured to predict a thermal shrinkage amount after manufacturing;
a thermal shrinkage modifying unit configured to obtain a thermal deformation modifying profile by expanding a target profile representing an outer edge of the target shape of the built object according to the thermal shrinkage amount;
a release strain prediction unit configured to predict an elastic deformation amount due to release strain of the deposited body after the machining;
a release strain modifying unit configured to obtain an elastic deformation modifying profile by deforming the thermal deformation modifying profile according to the elastic deformation amount in a direction opposite to a deformation direction due to the release strain; and
an excess metal amount setting unit configured to adjust an outer edge shape of the deposited body so that an excess metal amount from the elastic deformation modifying profile to an outer edge of the deposited body falls within a predetermined reference range.

According to the excess metal amount setting device, highly accurate manufacturing and machining may be performed in consideration of the thermal deformation after the manufacturing and the release strain after the machining, and machining efficiency may be increased by reducing the time required for the machining.

(10) A method for manufacturing a built object, including:
additively manufacturing, with the weld beads, the deposited body designed by the excess metal amount setting method discussed above, performing the machining, and forming into the built object having the target shape.

According to the method for manufacturing a built object, the built object in which a deposited body in which an excess metal amount is appropriately set is built with weld beads, and the deposited body is machined to have a target shape may be efficiently manufactured with high accuracy.

(11) A program for causing a computer to execute a procedure of an excess metal amount setting method for setting an excess metal amount of a deposited body in manufacturing the deposited body with weld beads formed by melting and solidifying a filler metal and forming a built object having a target shape by performing machining on the deposited body, the program causing the computer to execute:
a thermal shrinkage prediction procedure of predicting a thermal shrinkage amount in the deposited body after manufacturing;
a thermal shrinkage modifying procedure of obtaining a thermal deformation modifying profile by expanding a target profile representing an outer edge of the target shape of the built object according to the thermal shrinkage amount;
a release strain prediction procedure of predicting an elastic deformation amount due to release strain of the deposited body after the machining;
an elastic deformation modifying procedure of obtaining an elastic deformation modifying profile by deforming the thermal deformation modifying profile according to the elastic deformation amount in a direction opposite to a deformation direction due to the release strain; and
an excess metal amount setting procedure of adjusting an outer edge shape of the deposited body so that an excess metal amount from the elastic deformation modifying profile to an outer edge of the deposited body falls within a predetermined reference range.

According to the program, the excess metal amount may be appropriately set by expanding the target profile representing the outer edge of the target shape according to the predicted thermal shrinkage amount, and further deforming the target profile according to the predicted elastic deformation amount of release strain due to the machining. As a result, highly accurate manufacturing and machining may be performed in consideration of the thermal deformation after manufacturing and the release strain after machining, and machining efficiency may be increased by reducing the time required for the machining.

The present application is based on Japanese Patent Application (Japanese Patent Application No. 2018-237049) filed on Dec. 19, 2018, and contents thereof are incorporated herein by reference.

REFERENCE SIGNS LIST

15 Excess metal amount setting unit
17 Display unit
19 Input unit
21 Thermal shrinkage prediction unit
23 Thermal shrinkage modifying unit
25 Release strain prediction unit
27 Release strain modifying unit
61 Built object
63 Weld bead
65 Deposited body
100 Excess metal amount setting device
Fm filler metal
Pm Target profile
Pmn Thermal deformation modifying profile
Pmd Elastic deformation modifying profile
Pmd1 First elastic deformation modifying profile
Pmd2 Second elastic deformation modifying profile
Ps Deposited body profile

The invention claimed is:
1. An excess metal amount setting method for setting an excess metal amount of a deposited body in manufacturing the deposited body with weld beads formed by melting and solidifying a filler metal and forming a built object having a target shape by performing machining on the deposited body, the excess metal amount setting method comprising:
- a thermal shrinkage prediction step of predicting a thermal shrinkage amount in the deposited body after manufacturing;
- a thermal shrinkage modifying step of obtaining a thermal deformation modifying profile by expanding a target profile representing an outer edge of the target shape of the built object according to the thermal shrinkage amount;
- a release strain prediction step of predicting an elastic deformation amount due to release strain of the deposited body after the machining;
- an elastic deformation modifying step of obtaining an elastic deformation modifying profile by deforming the thermal deformation modifying profile according to the elastic deformation amount in a direction opposite to a deformation direction due to the release strain; and
- an excess metal amount setting step of adjusting an outer edge shape of the deposited body so that an excess metal amount from the elastic deformation modifying profile to an outer edge of the deposited body falls within a predetermined reference range.

2. The excess metal amount setting method according to claim 1, wherein
- the machining includes rough processing and finish processing,
- in the release strain prediction step, a first elastic deformation amount caused by release strain due to the rough processing and a second elastic deformation amount caused by release strain due to the finish processing are predicted respectively, and
- in the elastic deformation modifying step, a first elastic deformation modifying profile obtained by deforming the thermal deformation modifying profile according to the first elastic deformation amount and a second elastic deformation modifying profile obtained by deforming the first elastic deformation modifying profile according to the second elastic deformation amount are obtained.

3. The excess metal amount setting method according to claim 1, wherein,
- in the excess metal amount setting step, in a case where the excess metal amount does not fall within the reference range, the outer edge shape of the deposited body is adjusted by changing at least one of the number of weld beads and a bead length.

4. The excess metal amount setting method according to claim 1, wherein,
- in the excess metal amount setting step, the excess metal amount in a deposition direction of the weld bead is set to be equal to or less than a thickness of one layer of the weld bead.

5. The excess metal amount setting method according to claim 1, wherein
- the built object has a portion having an overhang shape in a deposition direction of the weld bead.

6. The excess metal amount setting method according to claim 5, wherein
- the outer edge shape of the deposited body is adjusted only in a portion of the deposited body that becomes the overhang shape of the built object.

7. The excess metal amount setting method according to claim 1, wherein the weld bead is formed by melting the filler metal using an arc as a heat source.

8. The excess metal amount setting method according to claim 1, further comprising:
- a displaying step of displaying, in an overlapping manner, a deposited body profile representing an outer edge shape of the deposited body and at least one of the thermal deformation modifying profile and the elastic deformation modifying profile on a display unit;
- an input step of receiving a change instruction of a building region of the deposited body; and
- a displaying step of displaying, on the display unit, the deposited body profile of the deposited body obtained by changing the outer edge shape of the deposited body according to the input change instruction.

9. An excess metal amount setting device that sets that sets an excess metal amount of a deposited body in manufacturing the deposited body with weld beads formed by melting and solidifying a filler metal and forming a built object having a target shape by performing machining on the deposited body, the excess metal amount setting device comprising:
- a thermal shrinkage prediction unit configured to predict a thermal shrinkage amount after manufacturing;
- a thermal shrinkage modifying unit configured to obtain a thermal deformation modifying profile by expanding a target profile representing an outer edge of the target shape of the built object according to the thermal shrinkage amount;
- a release strain prediction unit configured to predict an elastic deformation amount due to release strain of the deposited body after the machining;
- a release strain modifying unit configured to obtain an elastic deformation modifying profile by deforming the thermal deformation modifying profile according to the elastic deformation amount in a direction opposite to a deformation direction due to the release strain; and
- an excess metal amount setting unit configured to adjust an outer edge shape of the deposited body so that an excess metal amount from the elastic deformation modifying profile to an outer edge of the deposited body falls within a predetermined reference range.

10. A method for manufacturing a built object, comprising:
- additively manufacturing, with the weld beads, the deposited body designed by the excess metal amount setting method according to claim 1, performing the machining, and forming into the built object having the target shape.

11. A method for manufacturing a built object, comprising:
- additively manufacturing, with the weld beads, the deposited body designed by the excess metal amount setting method according to claim 5, performing the machining, and forming into the built object having the target shape.

12. A method for manufacturing a built object, comprising:
- additively manufacturing, with the weld beads, the deposited body designed by the excess metal amount setting method according to claim 6, performing the machining, and forming into the built object having the target shape.

13. A method for manufacturing a built object, comprising:
- additively manufacturing, with the weld beads, the deposited body designed by the excess metal amount setting method according to claim 7, performing the machining, and forming into the built object having the target shape.

14. A non-transitory computer readable medium storing a program for causing a computer to execute a procedure of an excess metal amount setting method for setting an excess metal amount of a deposited body in manufacturing the deposited body with weld beads formed by melting and solidifying a filler metal and forming a built object having a target shape by performing machining on the deposited body, the program causing the computer to execute:
- a thermal shrinkage prediction procedure of predicting a thermal shrinkage amount in the deposited body after manufacturing;
- a thermal shrinkage modifying procedure of obtaining a thermal deformation modifying profile by expanding a target profile representing an outer edge of the target shape of the built object according to the thermal shrinkage amount;
- a release strain prediction procedure of predicting an elastic deformation amount due to release strain of the deposited body after the machining;
- an elastic deformation modifying procedure of obtaining an elastic deformation modifying profile by deforming the thermal deformation modifying profile according to the elastic deformation amount in a direction opposite to a deformation direction due to the release strain; and
- an excess metal amount setting procedure of adjusting an outer edge shape of the deposited body so that an excess metal amount from the elastic deformation modifying profile to an outer edge of the deposited body falls within a predetermined reference range.

* * * * *